E. ECK.
PORTABLE WINDLASS.
APPLICATION FILED APR. 1, 1921.
1,386,693.
Patented Aug. 9, 1921.
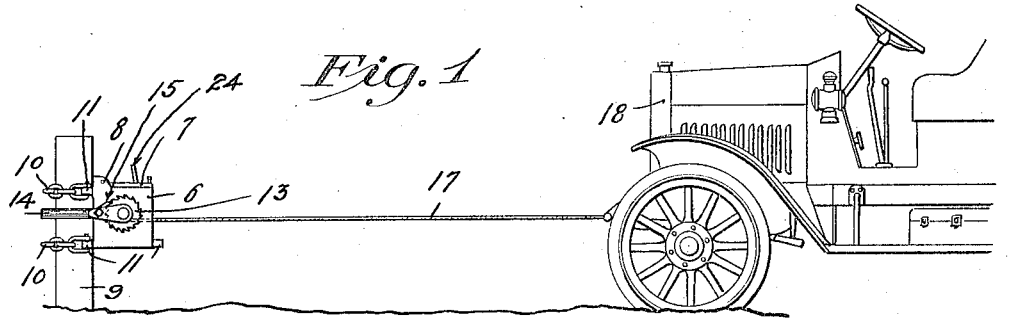
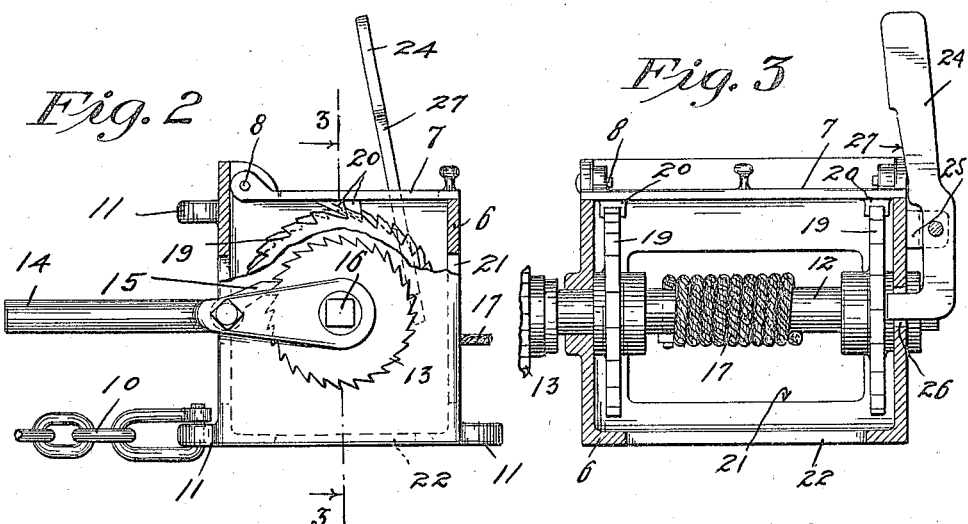
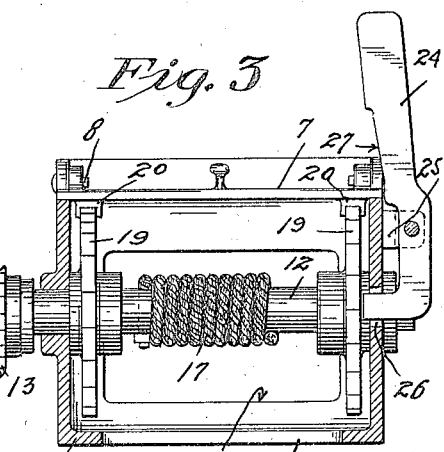
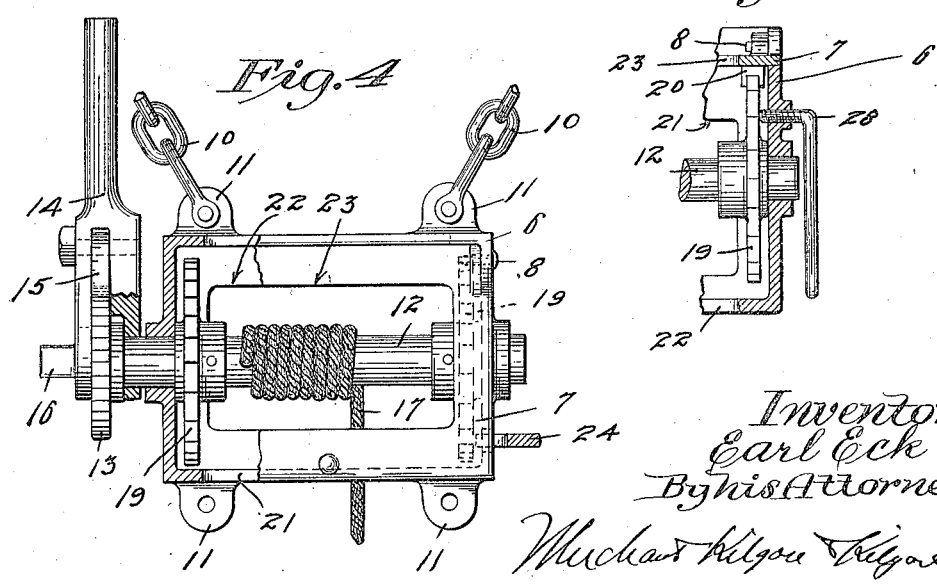
Inventor
Earl Eck
By his Attorneys

UNITED STATES PATENT OFFICE.

EARL ECK, OF ROBBINSDALE, MINNESOTA.

PORTABLE WINDLASS.

1,386,693.　　　　　Specification of Letters Patent.　　Patented Aug. 9, 1921.

Application filed April 1, 1921. Serial No. 457,691.

*To all whom it may concern:*

Be it known that I, EARL ECK, a citizen of the United States, residing at Robbinsdale, in the county of Hennepin and State of Minnesota, have invented certain new and useful Improvements in Portable Windlasses; and I do hereby declare the following to be a full, clear, and exact description of the invention, such as will enable others skilled in the art to which it appertains to make and use the same.

My invention provides an improved device herein designated as a portable auto windlass, and which device is adapted to be carried by an automobile, motor truck or other vehicle, and is adapted to be used, when required, as a windlass to pull a vehicle out of a place where it is stuck or cannot be moved by its own tractive power.

Generally stated, the invention consists of the novel devices and combinations of devices hereinafter described and defined in the claims.

In the accompanying drawings, which illustrate the invention, like characters indicate like parts throughout the several views.

Referring to the drawings:

Figure 1 is a side elevation showing a portion of an automobile and illustrating the use of the windlass to pull the machine out of a place where it is stuck;

Fig. 2 is a side elevation of the windlass, with some parts broken away and some parts sectioned;

Fig. 3 is a vertical section taken approximately on the line 3—3 of Fig. 2, some parts being shown in full and some parts being broken away;

Fig. 4 is a plan view of the windlass, some parts being broken away and some parts being sectioned; and Fig. 5 is a fragmentary view in vertical section, illustrating a modified form of the brake mechanism of the windlass.

The body of the windlass is preferably in the form of a rectangular metallic cast box 6 having a lid 7 hinged thereto at 8. This box is adapted to be anchored to a post 9, tree trunk or the like, by a suitable anchoring means, which, as shown, comprises chains 10 secured to lugs 11 on the box 6. Mounted within the box 6 is a shaft 12 that affords a windlass drum and is extended through one end of the box and provided with a ratchet wheel 13. The numeral 14 indicates a large actuating lever, the end of which is forked, so that it straddles the ratchet wheel 13 and is pivoted on the shaft 12. This lever 14 is provided with a dog or pawl 15 that coöperates with the ratchet wheel 13. The outer end of the shaft 12 is provided with an angular shank 16, to which a wrench may be applied when much power is not required and rapid winding of the cable is desired.

The pulling cable 17 is attached to and adapted to be wound upon the drum-forming portion of the shaft 12, and its extended end is adapted to be connected to an automobile indicated as an entirety by the numeral 18 in Fig. 1.

Within the box 6, the windlass shaft 12 is provided with laterally spaced retaining ratchet wheels 19 located close to the ends of the box. The cover 7 is provided with depending pawl-like lugs 20 that coöperate, one with each of the ratchet wheels 19, and operate as retaining dogs to prevent accidental backward rotation of the windlass shaft 12 and unwinding of the cable therefrom under strain.

When the device is applied as shown in Fig. 1, it is, of course, useful to pull an automobile out of any place where it may be stuck in the road or elsewhere. However, the windlass is adapted to be used in various other different ways and the cable may sometimes require to be extended horizontally forward or vertically upward or vertically downward and, hence, the box 6 is provided in its front wall with a large cable-clearing passage 21, in its bottom with a similar cable passage 22 and in its lid 7 with a similar large cable passage 23.

For controlling the unwinding movement of the cable when the cable is under strain to rapidly unwind, I provide a brake lever. This brake lever, in the construction illustrated in Figs. 1 to 4, inclusive, is in the form of a lever 24 intermediately pivoted to a lug 25 on the box 6 with its lower end working through an opening 26 in the adjacent end of the box 6 and adapted for frictional contact with the face of the adjacent ratchet wheel 19. This lever 24 has a cam surface 27, which, when the lid 7 is raised slightly above the position into which it is raised by rotation of the ratchet wheels 19 acting on the dogs 20, will be engaged by the adjacent edge of such raised lid and thereby moved so that its lower end will frictionally engage the adjacent ratchet wheel 19 and act as a frictional brake to control unwinding movements of the cable. The pressure at which the brake will be set may be regulated by the distance to which the cover 7 is raised after it is engaged with the cam surface 27 of the lever 24.

Fig. 5 illustrates a modified form of the brake device, in which the brake lever 28 has a laterally bent threaded end working with threaded engagement through the adjacent head of the box 6 with its inner end engageable with the face of the adjacent ratchet wheel 19. Obviously, this brake can be set with any desired tension by forcing the threaded end thereof with greater or less pressure against the said ratchet wheel.

By reference to Fig. 2, it will be noted that the lugs 20 and the teeth of the ratchet wheels 19 have undercut engagement, so that they will have a positive interlocking engagement tending to hold the lid down until the lug is relieved from strain by slight forward rotation of the windlass drum or shaft.

What I claim is:

1. A portable device of the kind described comprising a box having means for detachably anchoring it to a suitable support, a windlass drum mounted within said box and having a ratchet wheel, a hinged lid for the box having a holding lug coöperating with said ratchet wheel, a lever for operating said drum from the exterior of the box, a cable attached to said drum, and a friction brake operative to control cable-unwinding movements of the drum.

2. A portable device of the kind described comprising a box having means for detachably anchoring it to a suitable support, a windlass drum mounted within said box and having a ratchet wheel, a hinged lid for the box having a holding lug coöperating with said ratchet wheel, a lever for operating said drum from the exterior of the box, a cable attached to said drum, and a friction brake operative to control cable-unwinding movements of the drum, the teeth of said ratchet wheel and the holding lug on said lid being undercut so that they will have a positive interlocking engagement.

3. A portable device of the kind described comprising a box having means for detachably anchoring the same to a suitable support, a windlass drum within said box, a ratchet wheel carried by said drum, a hinged lid for said box having a holding lug engageable with said ratchet wheel, a lever for rotating said windlass drum, and a friction brake rendered operative by opening movements of said lid beyond a predetermined point.

4. A portable device of the kind described comprising a box having means for detachably anchoring the same to a suitable support, a windlass drum within said box, a ratchet wheel carried by said drum, a hinged lid for said box having a holding lug engageable with said ratchet wheel, a lever for rotating said windlass drum, a brake lever intermediately pivoted to said box with one end frictionally engageable with said ratchet wheel, the other end of said lever having a cam surface with which said lid is engageable when opened to a predetermined extent, to render said brake lever operative.

In testimony whereof I affix my signature.

EARL ECK